United States Patent [19]

Heiermann et al.

[11] 4,018,114
[45] Apr. 19, 1977

[54] DEVICE ON PEELING MACHINE

[75] Inventors: Klaus Heiermann; Carl-Ludwig Pohler; Joachim Bertenburg, all of Solingen, Germany

[73] Assignee: Th. Kieserling & Albrecht, Solingen, Germany

[22] Filed: Sept. 30, 1975

[21] Appl. No.: 618,018

[52] U.S. Cl. .................................................. 82/20
[51] Int. Cl.[2] ......................................... B23B 5/00
[58] Field of Search ........................................ 82/20

[56] References Cited

UNITED STATES PATENTS

| | | | |
|---|---|---|---|
| 1,669,264 | 5/1928 | Reis | 82/20 |
| 1,888,792 | 11/1932 | Cottrell | 82/20 |
| 2,289,167 | 7/1942 | Bannister et al. | 82/20 |
| 3,059,514 | 10/1962 | Lindemann | 82/20 |

*Primary Examiner*—Harrison L. Hinson
*Attorney, Agent, or Firm*—Edward E. Sachs

[57] ABSTRACT

The present invention relates to an improvement in a peeling machine having a hollow shaft carrying a cutter-head, the improvement being characterized in that the machine includes a clamping device for feeding and removing a workpiece, the clamping device clamps each end of the workpiece, and moves through the hollow shaft and is adapted to move the workpiece axially of the cutter-head, the clamping device maintains the workpiece in a clamped position during a complete peeling operation.

7 Claims, 4 Drawing Figures

DEVICE ON PEELING MACHINE

The present invention relates to peeling machines and more particularly, to an improved clamping arrangement for peeling machines. In order to make it possible to process short workpieces in peeling machines, it has been proposed to arrange a collet on the rear clamping carriage, as seen in the direction of travel of the workpieces, the collet being adapted to enter the hollow shaft, to clamp the front end of the workpiece already passing through the cutter-head, and to be drawn completely through the said cutter-head. However, this solution requires that the diameter of the hollow-shaft bearings be substantially larger than would otherwise be necessary for peeling long workpieces. This inevitably results in a substantial increase in the price of the machine. Another disadvantage in such an arrangement is that short workpieces are not held at both ends throughout the peeling operation.

According to a further proposal, in order to make it possible to peel short lengths of pipe on a peeling machine designed for long workpieces, and to avoid the disadvantage of large hollow-shaft bearings, a pair of carriages are provided with clamping means in the form of mandrels projecting into the pipe, the mandrels being tightened and released by means of toggle-levers and pistons, in accordance with the movements of the clamping carriages. This proposal also requires two clamping carriages, with appropriate clamping and control means for each carriage.

It is therefore an object of the present invention to provide an improved peeling machine especially suitable for feeding and removing short workpieces.

It is a further object of the present invention to provide a peeling machine such that the pair of clamping carriages heretofore used for this purpose may be eliminated.

It is a further object of the present invention to provide a peeling machine wherein a simple sequential control necessary for the automatic motions of a clamping device in feeding and removing the workpieces reduces the investment costs of the equipment. It is a still further object of the present invention to provide a peeling machine wherein the workpieces are clamped at both ends during the entire peeling operation.

According to one aspect of the present invention, in a peeling machine having a hollow shaft carrying a cutterhead, there is provided the improvement wherein the machine includes a clamping device for feeding and removing a workpiece, the clamping device clamping each end of the workpiece, and moves through the hollow shaft and is adapted to move the workpiece axially of the cutter-head, the clamping device maintains the workpiece in a clamped position during a complete peeling operation.

According to the invention, the clamping device is constructed and arranged in a manner such that the workpieces is already clamped and securely held by two ends of the clamping device before the workpiece enters the peeling machine, and remain so secured during the entire peeling operation. The clamping device is, preferably, in the form of a double-acting piston-cylinder drive and an abutment connected thereto by means of rails, the rails being connected together by cross members running on wheels, and at least one of the said rails being provided with teeth engaging with a driven pinion. In order to make it possible for the piston rod to absorb the cutting torque, the double-acting piston has a second piston rod fitted with fin-like radial projections sliding in corresponding guides in the cross member accommodating the cylinder-piston drive. It lies within the scope of the invention also to use a double-acting cylinder-piston drive instead of the fixed abutment arranged in one of the cross members.

This construction and arrangement of the clamping device makes it possible to hold securely and peel short workpieces of any length and in the form of either rods or pipes. Discs and short pieces of rod may even be stacked and peeled. Only one "clamping carriage" is required, consisting of the cross members, connected together by the rails, for the accommodation of the means for clamping the workpieces, and this carriage may be moved back and forth by control means costing substantially less than conventional means.

An embodiment of a device according to the present invention is described hereinafter in greater detail in conjunction with the drawings attached hereto wherein.

Figure 1:
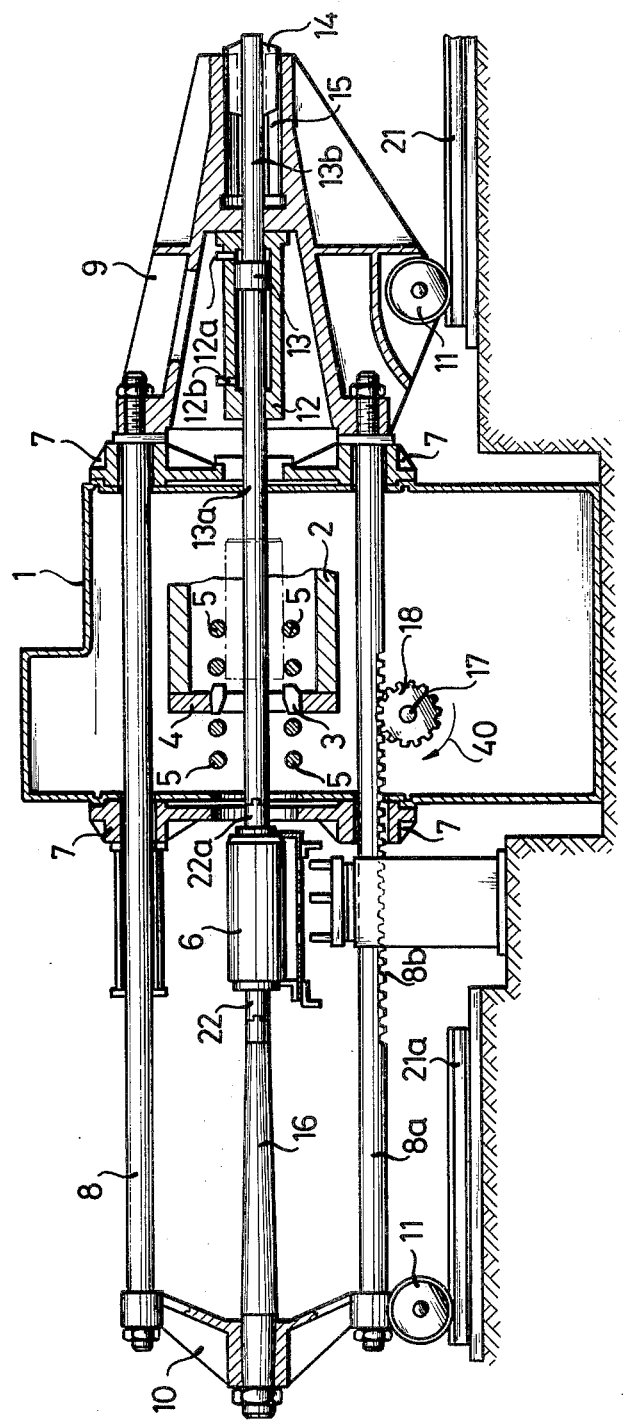
FIG. 1 is a side elevation view, partially in section, of a device having improved clamping means.
Figure 2:
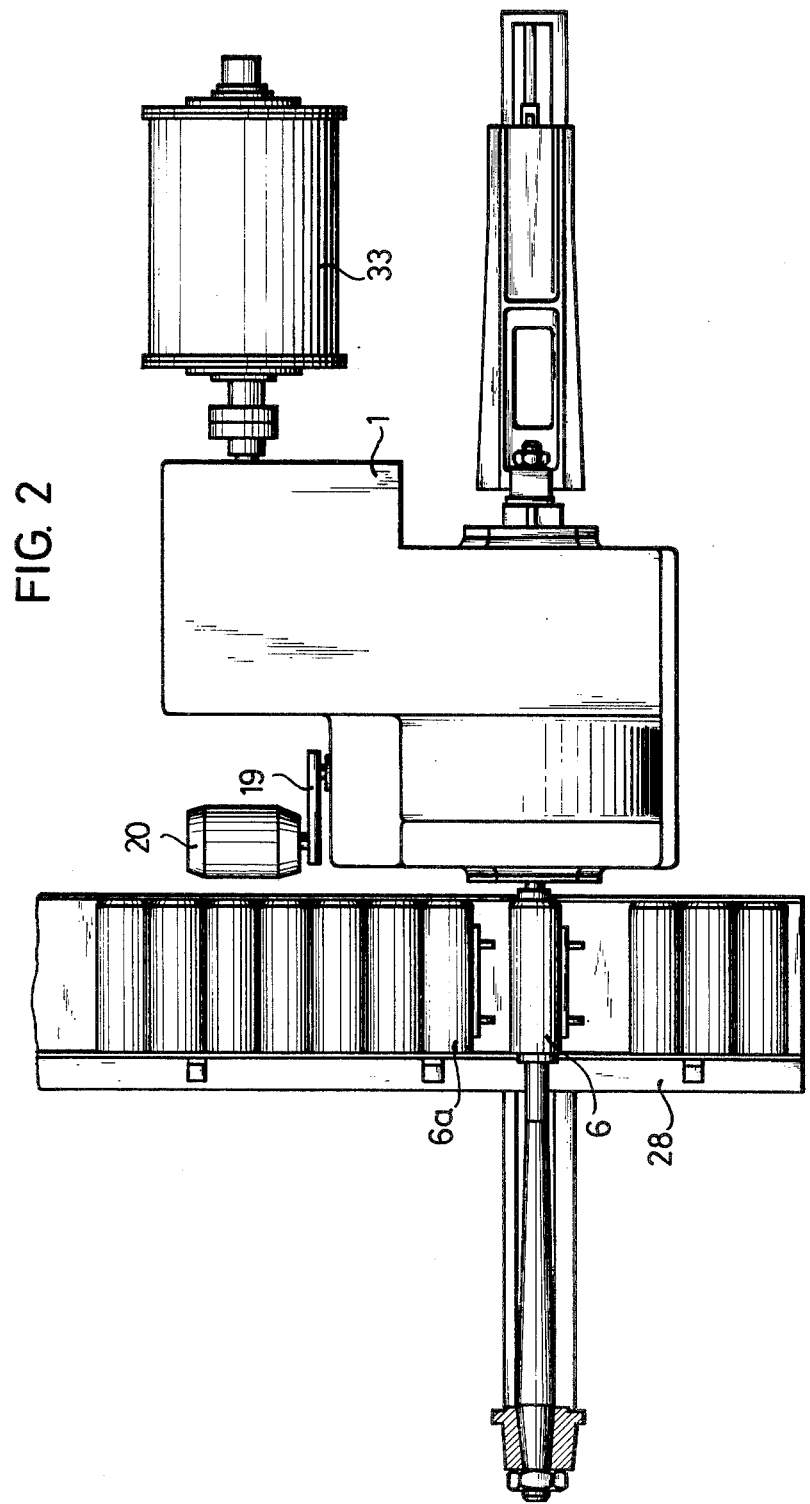
FIG. 2 is a plan view of the device of FIG. 1, showing the peeling machine and a feed platform for workpieces.
Figure 4:
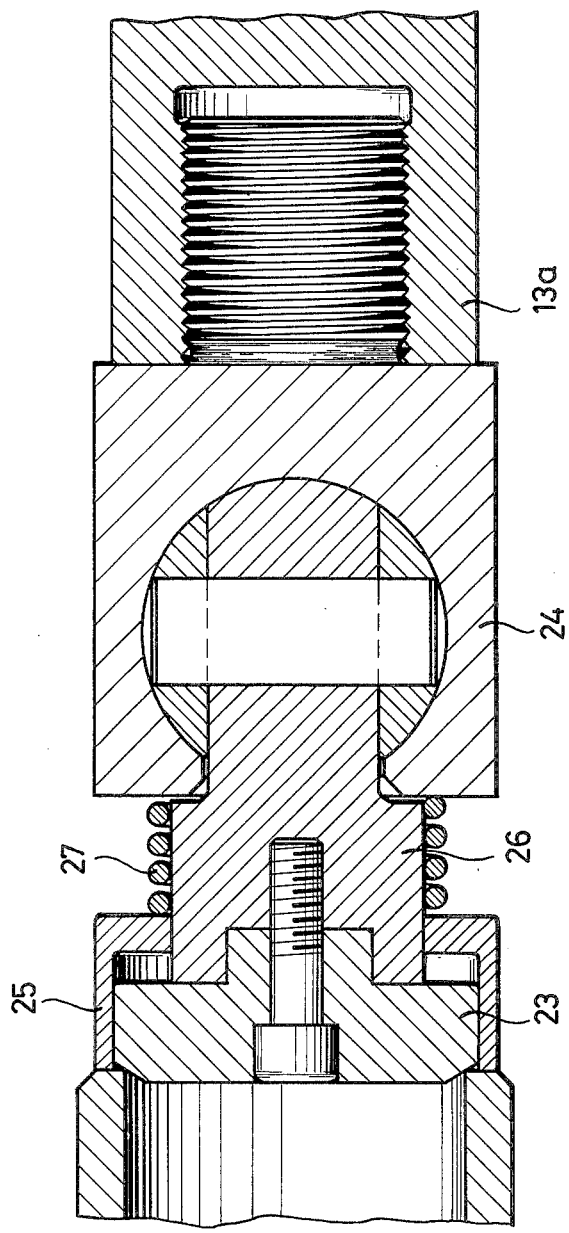
FIG. 4 is a cross-sectional view showing in detail, on enlarged scale, a clamping piece designed to clamp pipes.

Referring to FIGS. 1 and 2, there is shown a peeling machine 1, having a hollow shaft 2 carrying a cutter head 4 and peeling cutters 3, the details of these members being well known to those skilled in the art. The guide rollers, marked 5, support workpieces 6 in front of and behind the plane of the cutters. The peeling-machine housing is provided with slide guides 7 for two rails 8, 8a bolted securely to cross members 9, 10, running on wheels. Arranged in cross member 9 is a cylinder 12 containing a double-acting piston 13 equipped with two piston rods 13a, 13b. Rod 13a serves to clamp the workpieces, whereas rod 13b absorbs the cutting torque, to which end the said rod is equipped with fin-like radial projections 14 sliding in corresponding guides 15 is cross member 9. Attached to cross member 10, and secured against rotation in relation thereto, is a rod 16 which is arranged coaxially with piston rod 13a and serves as an abutment for the workpieces when they are clamped by piston rod 13a. Rail 8a has teeth 8b engaging with a pinion 18 secured to shaft 17. Shaft 17 is driven, through an intermediate drive, by a control motor 20 (see FIG. 2) adapted to rotate in either direction in order to move the "clamping carriage", consisting of cross members 9, 10 and rails 8, 8a, back and forth along tracks 21, 21a. Abutment 16 and piston rod 13a carry interchangeable clamping pieces 22, 22a, which may be replaced by clamping pieces 23, illustrated in FIG. 4, when pipes are to be clamped. As may be seen in FIG. 4, these clamping pieces are connected to piston rod 13a, and to abutment 16, by means of universal joints 24, so that workpieces which are not cut parallel may also be securely clamped. Clamping pieces 23 are covered by a sliding sleeve 25 guided on clamping-piece holder 26 and loaded by means of a spring 27, so that, at the conclusion of the peeling operation, the pieces of the pipe are released from the clamping pieces when piston rod 13a is retracted.

Figure 3:
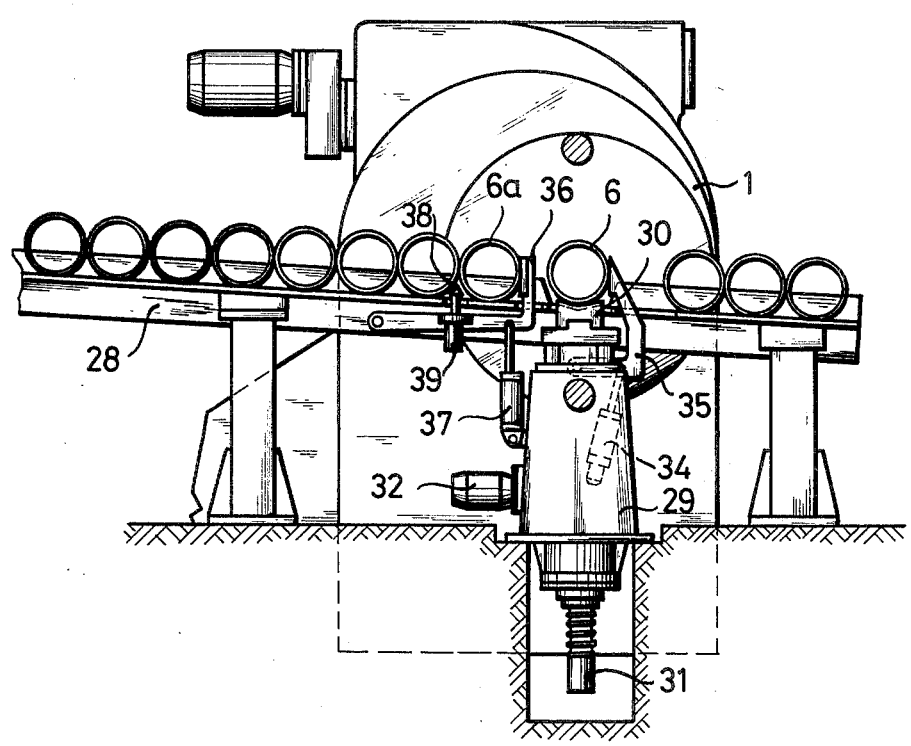
FIG. 3 is an end view showing details of the means for placing the workpieces in position ready for clamping.

The sequence of operation is as follows:

As may be seen in FIG. 3, a workpiece support 30 is arranged in a pedestal 29 below the feed platform 28, support 30 being raised and lowered by motor 32 through shaft 31 in order to take workpiece 6 from platform 28 and place it in the position shown in FIGS. 1 and 3 for clamping. As soon as support 30 has been moved, with the workpiece, into the clamping position shown, a pressure medium is fed, through port 12a, to cylinder 12, so that piston 13 is caused to move to the left and clamping pieces 22, 22a come to rest against the end-faces of the workpiece and clamp it. Motor 20 is then switched on, causing pinion 18 to rotate in the direction of arrow 40 and the "clamping carriage" to move to the right, until the workpiece reaches the position indicated in dotted lines within the hollow shaft. Hollow shaft 2 is driven by control motor 33. At the conclusion of the peeling operation, pinion 18 is driven in the opposite direction of rotation, causing the "clamping carriage" to return to its starting position. A pressure medium is then fed to cylinder 12 through port 12b, causing piston 13, and clamping piece 22a, to move a short distance to the right, thus releasing the workpiece. Pressure medium fed at this time to cylinder 34 causes the piston therein to lower stop 35 until the workpiece on platform 28 rolls away to the right as soon as support 30 moves to the position indicated in dotted lines. Stop 35 is then raised again, whereas stop 36 is lowered by actuating the piston running in cylinder 37 until the next workpiece 6a can roll onto support 30. Stop 38 prevents the workpieces from continuing to roll when workpiece 6a rolls onto support 30. When stop 36 again assumes the position shown in the drawing, stop 38 is lowered briefly and is then returned to its operative position. Stop 38 is arranged on the piston rod of a piston running in cylinder 39. A known sequential control makes it possible to repeat the foregoing sequence of operations as often as may be desired.

The feed and return of pressure medium to cylinders 12, 34, 37 and 39 is effected by means of electromagnetically controllable valves (not shown, a mode of operation well known to those skilled in the art.

It will be understood that the above-described embodiment is a preferred one only and that changes and modifications may be made thereto without departing from the spirit and scope of the invention.

What is claimed is:

1. In an apparatus including a peeling machine having a stationary hollow shaft carrying a cutter-head, the machine being adapted for peeling short workpieces including those having a length smaller than the axial length of the hollow shaft and cutter head, the improvement comprising: clamping means constructed and arranged to axially move as a whole relative to said cutter head and including a single clamping carriage; said clamping means further comprising first and second clamping elements adapted to securely clamp by frictional engagement axially opposed external ends of a workpiece externally of the cutter head and means for axially moving both of said clamping elements in unison and said clamped workpiece through the hollow shaft and said cutter-head while maintaining the workpiece in clamped condition during the entire peeling operation.

2. The apparatus of claim 1, wherein each of said clamping elements comprise rod clamping engagement means, and said clamping means includes structural support for the rods.

3. The apparatus of claim 2, further comprising a fluid piston drive connecting to one of said rods biasing such rod in the direction of the workpiece, and a structural abutment connecting to the other rod.

4. The apparatus of claim 3, wherein said drive includes a double acting piston.

5. The apparatus of claim 1, further comprising rail and movable mounting transport means to move the clamping means relative to the cutter head.

6. The apparatus of claim 1, said clamping carriage further comprising a pair of cross members connecting said rails, wheels mounted on said cross members, at least one of said rails having teeth engageable with a pinion.

7. The apparatus of claim 6, said clamping carriage further comprising a rod operatively associated with said double-acting piston, said rod having fin-like radial projections, said projections sliding in corresponding guides in the cross member.

* * * * *